(12) United States Patent
Mori et al.

(10) Patent No.: US 12,020,457 B2
(45) Date of Patent: Jun. 25, 2024

(54) VEHICLE IMAGING SYSTEM AND VEHICLE IMAGING METHOD

(71) Applicant: TOYOTA JIDOSHA KABUSHIKI KAISHA, Toyota (JP)

(72) Inventors: Masahiro Mori, Nisshin (JP); Takahiro Fujita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/969,057

(22) Filed: Oct. 19, 2022

(65) Prior Publication Data

US 2023/0169685 A1 Jun. 1, 2023

(30) Foreign Application Priority Data

Nov. 26, 2021 (JP) ................................. 2021-191867

(51) Int. Cl.
*G06T 7/80* (2017.01)
*G06T 7/73* (2017.01)
*G06V 10/40* (2022.01)
*G06V 20/62* (2022.01)
*H04N 7/18* (2006.01)
*H04N 23/661* (2023.01)

(52) U.S. Cl.
CPC ................. *G06T 7/80* (2017.01); *G06T 7/73* (2017.01); *G06V 10/40* (2022.01); *G06V 20/625* (2022.01); *H04N 7/185* (2013.01); *H04N 23/661* (2023.01); *H04N 23/662* (2023.01); *G06T 2207/30252* (2013.01); *G06V 2201/08* (2022.01)

(58) Field of Classification Search
CPC .. G06V 2201/08; G06V 10/40; G06V 20/625; G06T 7/80; G06T 7/73; G06T 2207/30252; H04N 23/662; H04N 23/661; H04N 7/185
See application file for complete search history.

(56) References Cited

U.S. PATENT DOCUMENTS

| | | | |
|---|---|---|---|
| 9,684,993 B2* | 6/2017 | Weitzberg | G06T 7/20 |
| 10,630,884 B2* | 4/2020 | Du | G01C 3/00 |
| 10,757,315 B2* | 8/2020 | Kusanagi | H04W 4/027 |
| 10,867,327 B1* | 12/2020 | Wilbert | G06Q 30/0611 |
| 10,944,900 B1* | 3/2021 | Nikitin | H04N 17/002 |
| 11,070,767 B1* | 7/2021 | Brown, Jr. | H04M 1/725 |
| 2009/0174769 A1* | 7/2009 | Katz | G08B 13/19623 |
| | | | 348/143 |

(Continued)

FOREIGN PATENT DOCUMENTS

| | | |
|---|---|---|
| JP | 2019-121319 A | 7/2019 |
| JP | 2019-180024 A | 10/2019 |
| JP | 2021-48449 A | 3/2021 |

*Primary Examiner* — Brian P Yenke
(74) *Attorney, Agent, or Firm* — Oliff PLC

(57) ABSTRACT

A vehicle imaging system includes: a first camera configured to capture an image of a vehicle; a second camera that is movable and that is configured to capture a video of the vehicle while the vehicle is traveling; and a controller configured to control the first and second cameras. The controller is configured to extract a feature of the vehicle from image data captured by the first camera, and control at least one of a position of the second camera, orientation of the second camera, and a speed of the second camera based on the feature.

11 Claims, 12 Drawing Sheets

(56) References Cited

U.S. PATENT DOCUMENTS

| | | | | |
|---|---|---|---|---|
| 2010/0226544 | A1* | 9/2010 | Uchida | G06T 7/246 382/107 |
| 2011/0109745 | A1* | 5/2011 | Nakatani | G01C 21/26 348/148 |
| 2013/0271604 | A1* | 10/2013 | Follesa | H04N 23/695 348/143 |
| 2013/0321580 | A1* | 12/2013 | Chou | H04N 13/271 348/46 |
| 2014/0257943 | A1* | 9/2014 | Nerayoff | G06T 7/292 382/104 |
| 2014/0319300 | A1* | 10/2014 | Kessler | F16M 11/425 248/285.1 |
| 2014/0376778 | A1* | 12/2014 | Muetzel | B60R 25/305 382/105 |
| 2015/0009476 | A1* | 1/2015 | Garland | F16M 11/24 352/243 |
| 2015/0213617 | A1* | 7/2015 | Kim | H04N 23/57 382/103 |
| 2015/0312400 | A1* | 10/2015 | Hansen | G06V 20/63 455/414.1 |
| 2016/0094793 | A1* | 3/2016 | Westmacott | H04N 23/61 348/159 |
| 2017/0276935 | A1* | 9/2017 | Sisbot | B60K 35/00 |
| 2018/0192006 | A1* | 7/2018 | Li | H04N 23/69 |
| 2018/0265194 | A1* | 9/2018 | Gauglitz | G06Q 50/16 |
| 2018/0295327 | A1* | 10/2018 | Yearwood | E04H 1/1238 |
| 2019/0094849 | A1* | 3/2019 | Kim | H04N 23/695 |
| 2019/0130749 | A1* | 5/2019 | Yamada | G08G 1/0112 |
| 2019/0193681 | A1* | 6/2019 | Ito | B60R 25/246 |
| 2019/0215437 | A1 | 7/2019 | Kusanagi et al. | |
| 2019/0215461 | A1* | 7/2019 | Sugaya | H04N 23/661 |
| 2019/0311614 | A1* | 10/2019 | Yang | G08G 1/052 |
| 2019/0349552 | A1* | 11/2019 | Kurihashi | G06F 16/587 |
| 2020/0005050 | A1* | 1/2020 | Higuchi | G06V 20/56 |
| 2020/0014857 | A1* | 1/2020 | Hei | G06V 10/147 |
| 2020/0066146 | A1* | 2/2020 | Ichikawa | G06V 20/54 |
| 2020/0074196 | A1* | 3/2020 | Gui | G06T 7/70 |
| 2020/0180759 | A1* | 6/2020 | Harada | H04N 1/00204 |
| 2021/0084261 | A1 | 3/2021 | Nishimura et al. | |
| 2021/0316857 | A1* | 10/2021 | Yanagishita | G06N 20/00 |
| 2021/0405661 | A1* | 12/2021 | Liu | G05D 1/0094 |
| 2022/0051432 | A1* | 2/2022 | Yamada | G06T 7/73 |
| 2022/0078333 | A1* | 3/2022 | Cui | H04N 7/181 |
| 2022/0124290 | A1* | 4/2022 | Nagao | G06V 20/52 |
| 2022/0166917 | A1* | 5/2022 | Tsurumi | G08G 5/0034 |
| 2022/0212787 | A1* | 7/2022 | Fujiwara | H04N 23/611 |
| 2022/0254038 | A1* | 8/2022 | Fuchikami | G06T 7/73 |
| 2023/0154211 | A1* | 5/2023 | Mori | G06V 10/764 382/103 |
| 2023/0245472 | A1* | 8/2023 | Aragon | G06V 20/588 348/148 |

* cited by examiner

≪IDENTIFICATION VIDEO≫

≪VIEWING VIDEO≫

VEHICLE IMAGING SYSTEM AND VEHICLE IMAGING METHOD

CROSS-REFERENCE TO RELATED APPLICATION

This application claims priority to Japanese Patent Application No. 2021-191867 filed on Nov. 26, 2021, incorporated herein by reference in its entirety.

BACKGROUND

1. Technical Field

The present disclosure relates to vehicle imaging systems and vehicle imaging methods.

2. Description of Related Art

A user who likes to drive may wish to capture an image of how his or her vehicle looks when it is moving. The user can post (upload) the captured image on, for example, a social networking service (hereinafter referred to as "SNS") so that many people can view the image. However, it is difficult for the user to capture an image of the user's moving vehicle while the user is driving the vehicle. A vehicle imaging service for capturing an image of how a vehicle looks when it is moving has been proposed.

For example, Japanese Unexamined Patent Application Publication No. 2019-121319 (JP 2019-121319 A) discloses a vehicle imaging assist device. When the license plate number of a vehicle is in an image captured by an imaging device, the vehicle imaging assist device determines that the vehicle is in the image, and posts the captured image on an SNS.

SUMMARY

One possible way to capture a vehicle to be imaged while the vehicle is moving is to image a vehicle by using a movable camera. In order to capture a video in which a vehicle looks attractive (so-called SNS-genic), it is necessary to move the movable camera appropriately.

The present disclosure provides a system and method for moving a movable camera appropriately when capturing a vehicle while the vehicle is moving.

A vehicle imaging system according to a first aspect of the present disclosure includes: a first camera configured to capture an image of a vehicle; a second camera that is movable and that is configured to capture a video of the vehicle while the vehicle is traveling; and a controller configured to control the first and second cameras. The controller is configured to extract a feature of the vehicle from image data captured by the first camera, and control at least one of a position of the second camera, orientation of the second camera, and a speed of the second camera based on the feature.

According to the above configuration, the position and the speed of the second camera are determined according to the vehicle by using the feature of the vehicle extracted from the image data captured by the first camera, so that the second camera can be moved appropriately.

In the first aspect, the controller may be configured to extract a traveling position or a traveling direction of the vehicle as the feature, and control either or both of the position of the second camera and the orientation of the second camera based on the traveling position or the traveling direction of the vehicle.

In the first aspect, the controller may be configured to extract a body size of the vehicle as the feature, and control either or both of the position of the second camera and the orientation of the second camera based on the body size of the vehicle.

In the first aspect, the controller may be configured to extract a traveling speed of the vehicle as the feature, and control the speed of the second camera based on the traveling speed of the vehicle.

In the first aspect, the controller may be configured to extract a body size, a body type, or a body color of the vehicle as the feature, and control the speed of the second camera based on the body size, the body type, or the body color of the vehicle.

In the first aspect, the controller may be configured to extract a body size of the vehicle as the feature, and further control a zoom magnification of the second camera based on the body size of the vehicle.

A vehicle imaging method that is performed by a computer according to a second aspect of the present disclosure includes: extracting a feature of a vehicle from image data captured by a first camera; and controlling at least one of a position of a movable second camera, orientation of the movable second camera, and a speed of the movable second camera based on the feature.

According to the above method, as in the configuration of the above system, the position or the speed of the second camera is determined according to the feature of the vehicle, so that the second camera can be moved appropriately.

According to the present disclosure, the movable camera can be moved appropriately when capturing the image of the vehicle while the vehicle is traveling.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described in detail with reference to the drawings. The same or corresponding portions are denoted by the same signs throughout the drawings, and description thereof will not be repeated.

First Embodiment

System Configuration

Figure 1:
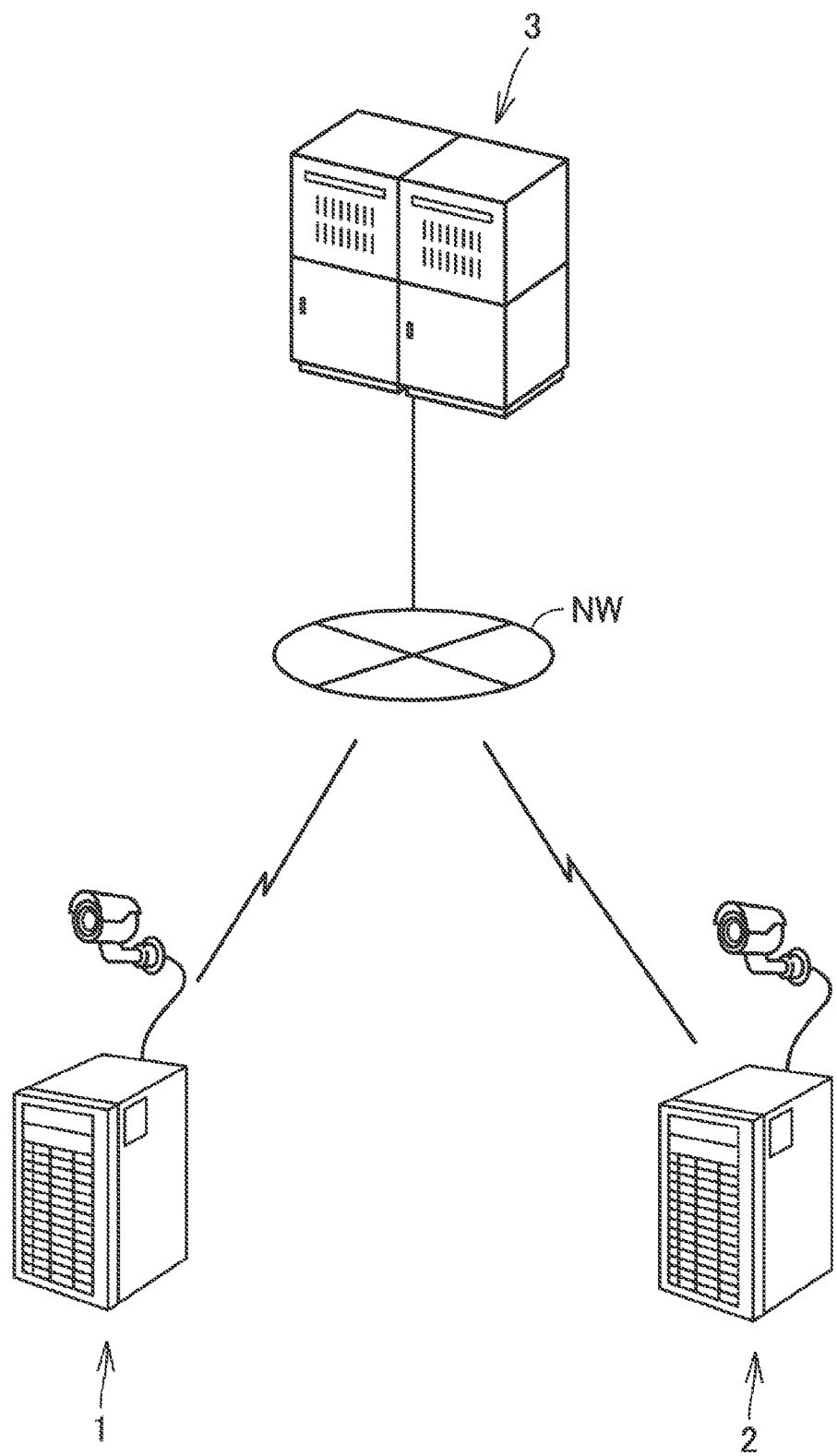
FIG. 1 schematically shows an overall configuration of a vehicle imaging system according to an embodiment of the present disclosure.

FIG. 1 schematically shows an overall configuration of a vehicle imaging system according to a first embodiment of the present disclosure. A vehicle imaging system 100 includes a fixed camera system 1, a movable camera system 2, and a server 3. The fixed camera system 1, the movable camera system 2, and the server 3 are connected to each other via a network NW so that the fixed camera system 1, the movable camera system 2, and the server 3 can communicate with each other.

The fixed camera system 1 and the movable camera system 2 are installed near a road such as a circuit, and capture a vehicle 9 (see FIG. 5) traveling on the road. Although FIG. 1 shows one fixed camera system 1 and one movable camera system 2, the vehicle imaging system 100 may include two or more fixed camera systems 1 and may include two or more movable camera systems 2.

The server 3 is, for example, an in-house server of a business operator that provides a vehicle imaging service. The server 3 may be a cloud server provided by a cloud server management company. The server 3 generates an image to be viewed by a user (hereinafter also referred to as "viewing image") from a captured video by using the fixed camera system 1 and the movable camera system 2, and provides the generated viewing image to the user. The viewing image is typically a still image, but may be a short video. In many cases, the user is, but is not particularly limited to, a driver of the vehicle 9.

Figure 2:
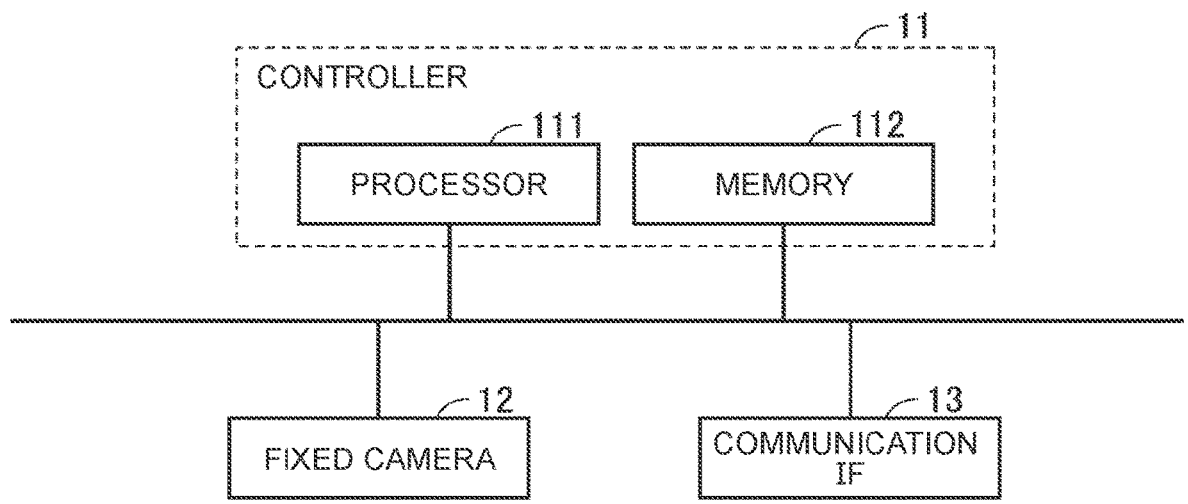
FIG. 2 is a block diagram showing a typical hardware configuration of a fixed camera system.

FIG. 2 is a block diagram showing a typical hardware configuration of the fixed camera system 1. The fixed camera system 1 includes a controller 11, a fixed camera 12, and a communication interface (IF) 13. The controller 11 includes a processor 111 and a memory 112. The components of the fixed camera system 1 are connected to each other by a bus etc.

The processor 111 controls the overall operation of the fixed camera system 1. The memory 112 includes a read-only memory (ROM), a random access memory (RAM), and a flash memory, all of which are not shown in the figure. The memory 112 stores programs (operating system and application programs) to be executed by the processor 111, and data (maps, tables, mathematical expressions, parameters, etc.) to be used in the programs. The memory 112 temporarily stores a video captured by the fixed camera system 1.

In the present embodiment, the fixed camera 12 captures a video from which the license plate number on the vehicle 9 can be recognized (hereinafter also referred to as "identification video"). The fixed camera 12 is preferably a high-sensitivity camera with a polarizing lens.

The communication IF 13 is an interface for communicating with the movable camera system 2 and the server 3. The communication IF 13 is, for example, a communication module compliant with the fourth generation (4G) or the fifth generation (5G).

Figure 3:
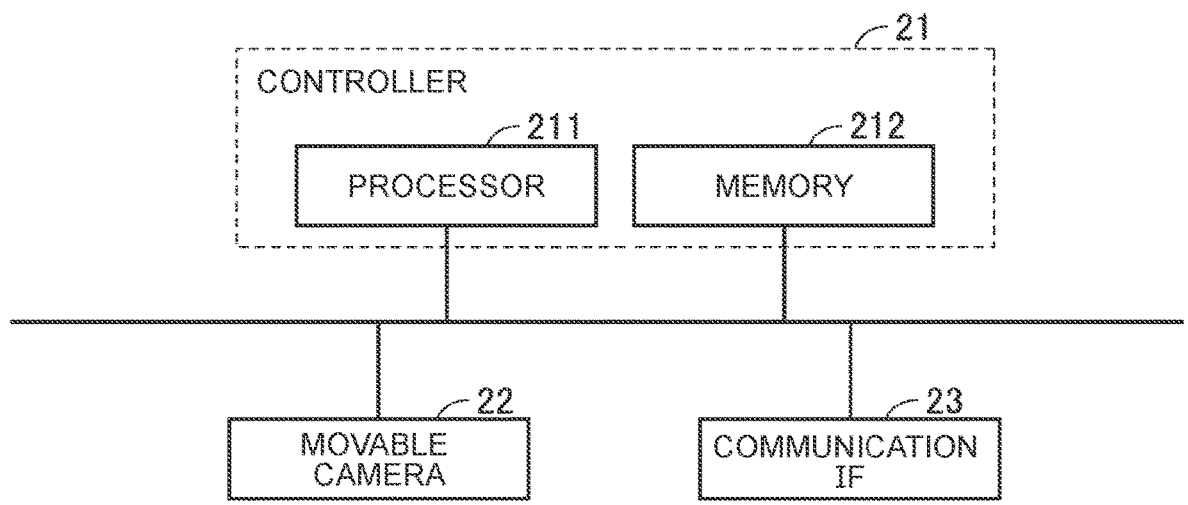
FIG. 3 is a block diagram showing a typical hardware configuration of a movable camera system.

FIG. 3 is a block diagram showing a typical hardware configuration of the movable camera system 2. The movable camera system 2 is different from the fixed camera system 1 (see FIG. 2) in that the movable camera system 2 includes a movable camera 22 instead of the fixed camera 12. Other configurations of the movable camera system 2 are the same as the configurations of the fixed camera 12.

The movable camera 22 captures a video to be used to generate a viewing image (hereinafter also referred to as "viewing video"). Like the fixed camera 12, the movable camera 22 is also preferably a high-sensitivity camera with a polarizing lens.

The fixed camera 12 corresponds to the "first camera" according to the present disclosure. The movable camera 22 corresponds to the "second camera" according to the present disclosure. The "first camera" being a fixed camera is merely illustrative, and both the "first camera" and the "second camera" may be movable cameras.

Figure 4:
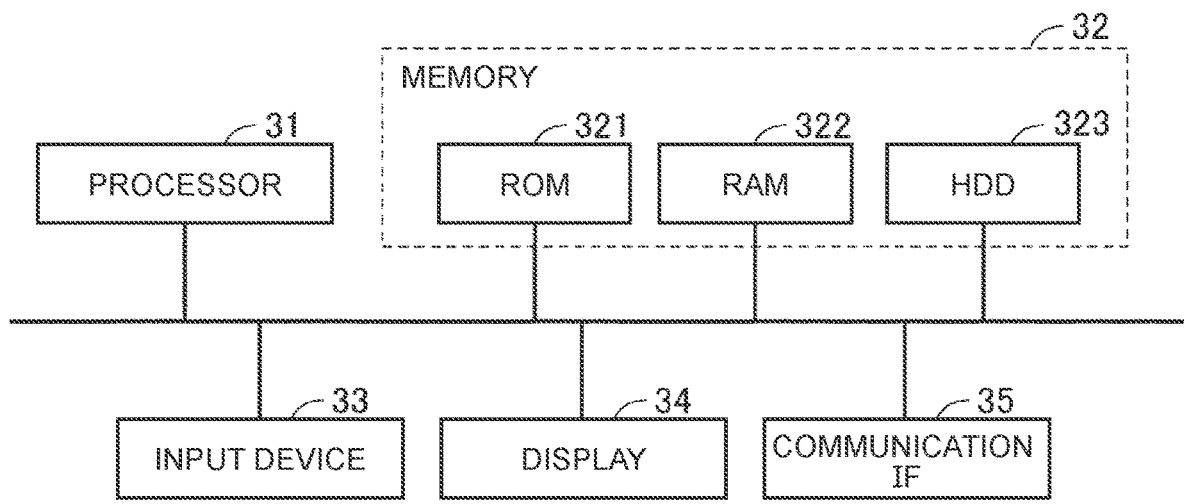
FIG. 4 is a block diagram showing a typical hardware configuration of a server.

FIG. 4 is a block diagram showing a typical hardware configuration of the server 3. The server 3 includes a processor 31, a memory 32, an input device 33, a display 34, and a communication IF 35. The memory 32 includes a ROM 321, a RAM 322, and a hard disk drive (HDD) 323. The components of the server 3 are connected to each other by a bus etc.

The processor 31 performs various kinds of arithmetic processing in the server 3. The memory 32 stores programs to be executed by the processor 31, and data to be used in the programs. The memory 32 also stores data to be used for image processing by the server 3, and stores data subjected to the image processing by the server 3. The input device 33 receives an input from an administrator of the server 3. The input device 33 is typically a keyboard and a mouse. The display 34 displays various kinds of information. The communication IF 35 is an interface for communicating with the fixed camera system 1 and the movable camera system 2.

How Vehicle Imaging is Performed

Figure 5:
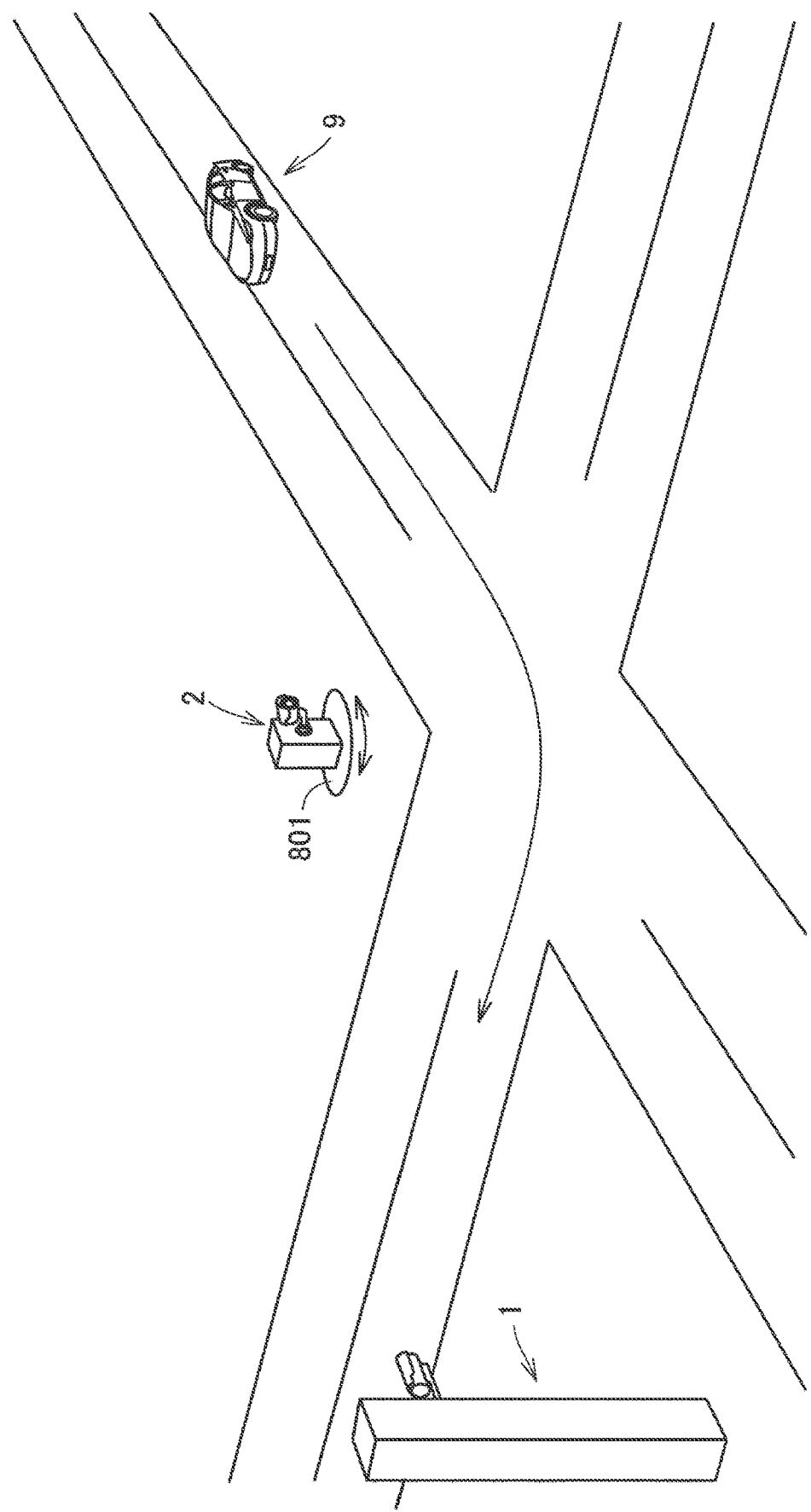
FIG. 5 is a first diagram (perspective view) showing how vehicle imaging is performed by the fixed camera system and the movable camera system according to the first embodiment.
Figure 6:
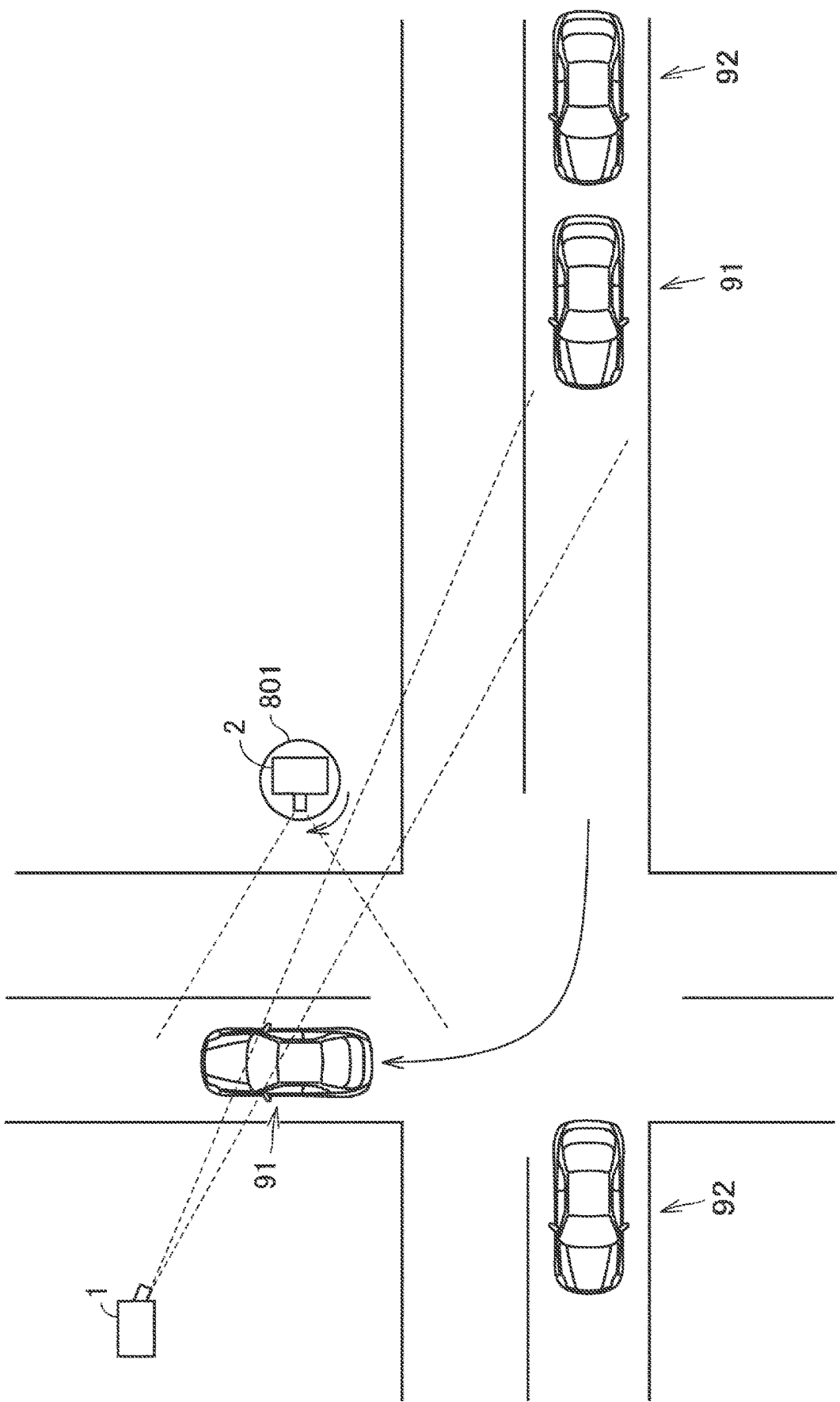
FIG. 6 is a second diagram (top view) showing how vehicle imaging is performed by the fixed camera system and the movable camera system according to the first embodiment.

FIG. 5 is a first diagram (perspective view) showing how vehicle imaging is performed by the fixed camera system 1 and the movable camera system 2 according to the first embodiment. FIG. 6 is a second diagram (top view) showing how vehicle imaging is performed by the fixed camera system 1 and the movable camera system 2 according to the first embodiment.

Referring to FIGS. 5 and 6, in the first embodiment, the fixed camera system 1 (fixed camera 12) captures an identification video in a direction in which the fixed camera system 1 (fixed camera 12) can capture a license plate. In this example, the identification video is captured substantially from the front of the vehicle 9.

The movable camera system 2 (movable camera 22) captures, while tracking the vehicle 9, a viewing video in which the vehicle 9 looks attractive (so-called SNS-genic). In this example, the movable camera system 2 is installed on a stage 801. The movable camera system 2 is thus configured to rotate (that is, configured so that the imaging angle of the movable camera system 2 can be changed). The movable camera system 2 is configured so that its height can be adjusted on the stage 801 (the position at which the movable camera system 2 captures a vehicle can be changed as will be described later).

Figure 7:
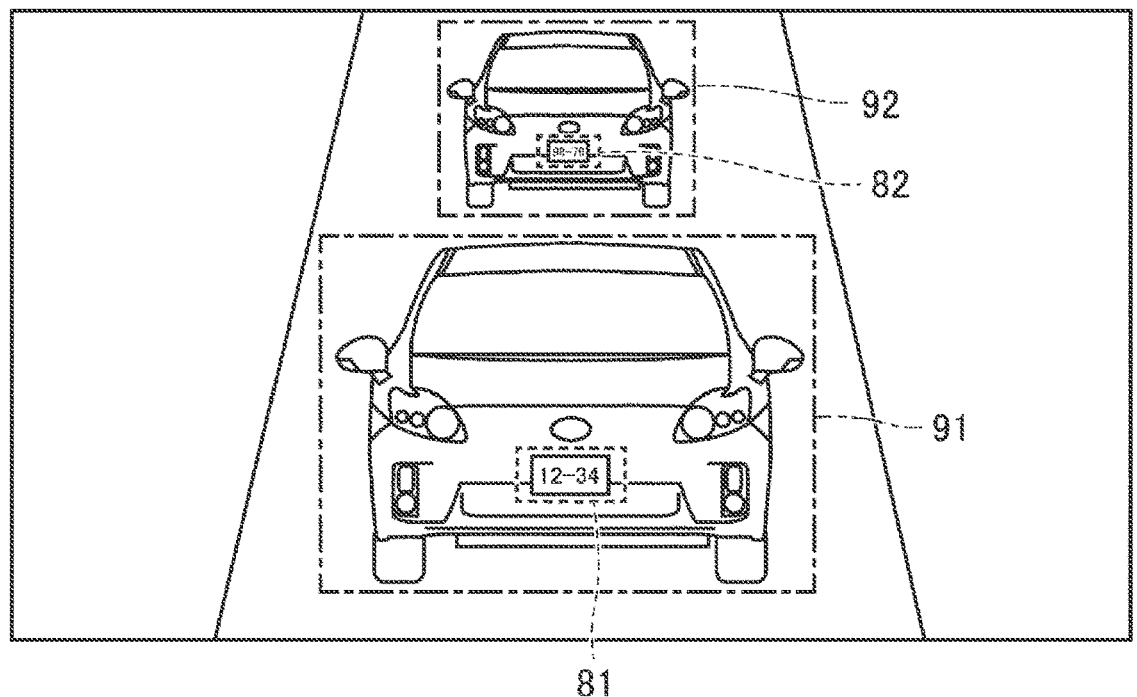
FIG. 7 shows an example of one frame of an identification video.

FIG. 7 shows an example of one frame of the identification video. As shown in FIGS. 6 and 7, there are cases in which a plurality of vehicles 9 (91, 92) is in the identification video. Among a plurality of vehicles, a vehicle to be imaged (vehicle whose viewing image is to be captured) is hereinafter referred to as "target vehicle" to distinguish this vehicle from other vehicles.

Figure 8:
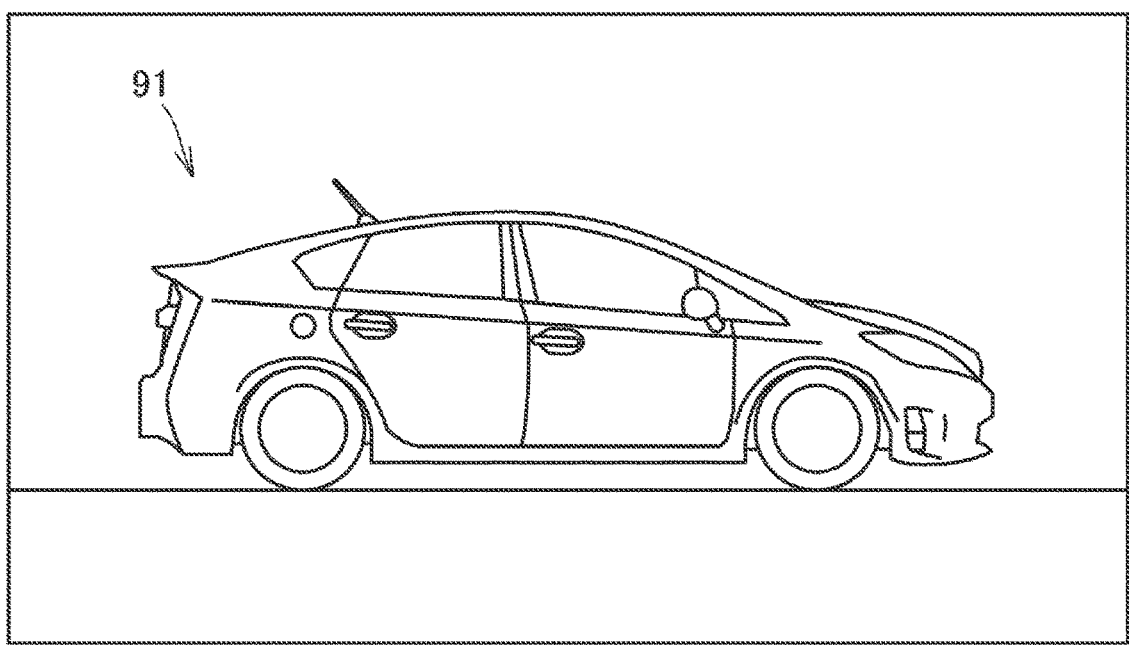
FIG. 8 shows an example of one frame of a viewing video.

FIG. 8 shows an example of one frame of the viewing video. In this example, the vehicle 91 that is a target vehicle turns right at an intersection, and the vehicle 92 that is not a target vehicle goes straight through the intersection. The movable camera system 2 captures a viewing video of the vehicle 91 turning right at the intersection by changing its capturing position (height in the vertical direction) and capturing angle (angle at which the camera is tilted with respect to the horizontal direction) as the vehicle 91 turns right.

It is not required that the license plate of the target vehicle (in this example, the vehicle 91) be in the viewing video. However, the license plate of the target vehicle may be in the viewing video.

The vehicles 9 (including the target vehicle) are not limited to four-wheeled vehicles shown in FIGS. 5 to 8, and may be, for example, two-wheeled vehicles (motorcycles). Two-wheeled vehicles have a license plate only on their rear. Therefore, a situation in which a license plate cannot be captured tends to occur, and it is difficult to identify which vehicle is the target vehicle.

Functional Configurations

Figure 9:
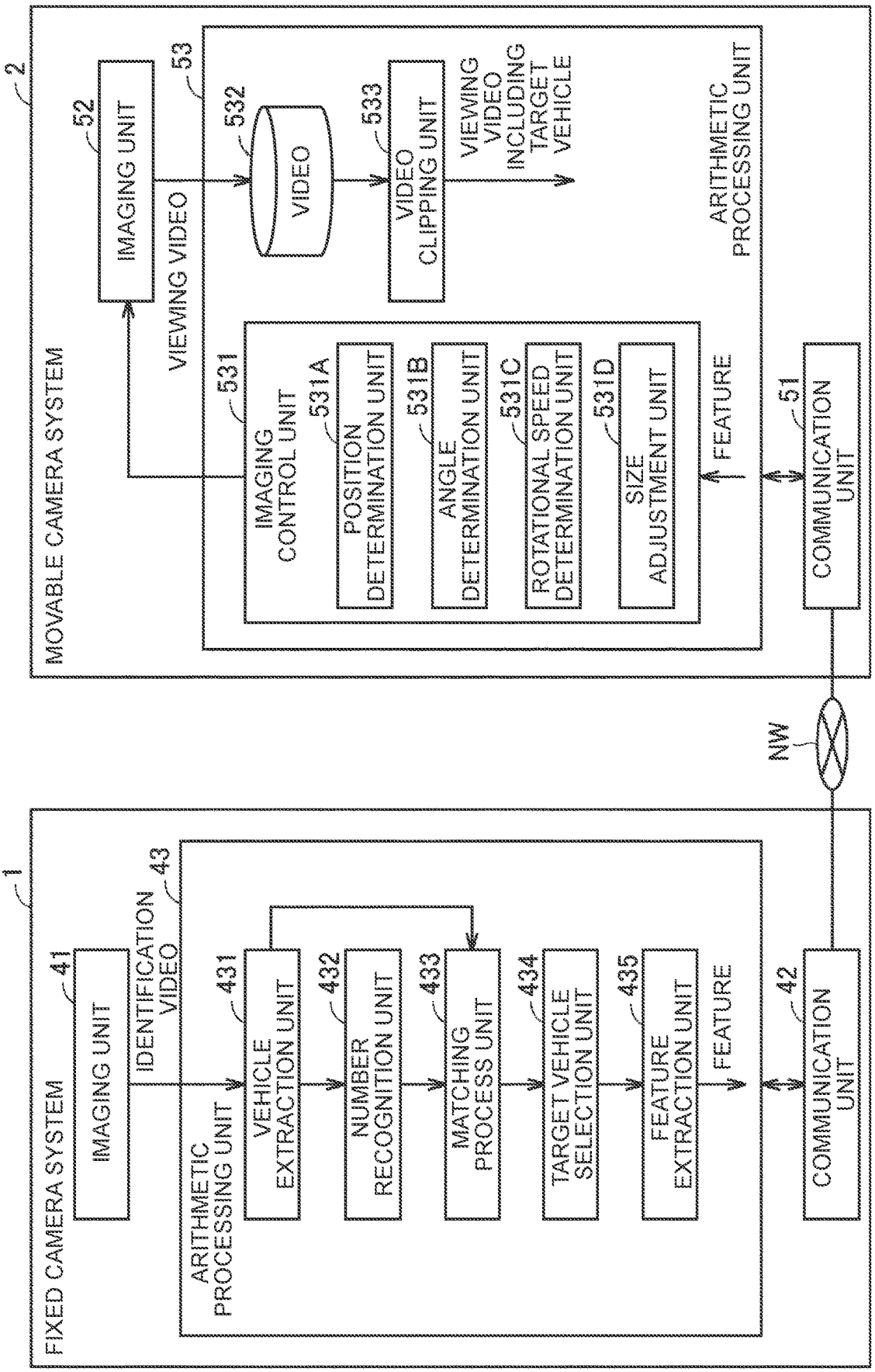
FIG. 9 is a functional block diagram showing functional configurations of the fixed camera system and the movable camera system according to the first embodiment.

FIG. 9 is a functional block diagram showing functional configurations of the fixed camera system 1 and the movable camera system 2 according to the first embodiment. The fixed camera system 1 includes an imaging unit 41, a communication unit 42, and an arithmetic processing unit 43. The arithmetic processing unit 43 includes a vehicle extraction unit 431, a number recognition unit 432, a matching process unit 433, a target vehicle selection unit 434, a feature extraction unit 435.

The imaging unit 41 captures an identification video from which the number recognition unit 432 can recognize a license plate number. The imaging unit 41 outputs the identification video to the vehicle extraction unit 431. The imaging unit 41 corresponds to the fixed camera 12 in FIG. 2.

The communication unit 42 bidirectionally communicate with a communication unit 51 (described later) of the movable camera system 2 and a communication unit 62 (described later) of the server 3 via the network NW. The communication unit 42 receives the license plate number of the target vehicle from the server 3. The communication unit 42 also transmits a feature (described later) extracted from the identification video to the movable camera system 2 and the server 3. The communication unit 42 corresponds to the communication IF 13 in FIG. 2.

The vehicle extraction unit 431 extracts vehicles (not only the target vehicle but all vehicles) from the identification video. This process is also referred to as "vehicle extraction process." For example, a trained model generated by the technology of machine learning such as deep learning can be used for the vehicle extraction process. The vehicle extraction unit 431 outputs a video of the extracted vehicles (frames including vehicles) out of the identification video to the number recognition unit 432 and the matching process unit 433.

The number recognition unit 432 recognizes license plate numbers from the video of the vehicles extracted by the vehicle extraction unit 431. A trained model generated by the technology of machine learning such as deep learning can also be used for this number recognition process. The number recognition unit 432 outputs the recognized license plate numbers to the matching process unit 433. The number recognition unit 432 also outputs the recognized license plate numbers to the communication unit 42. The license plate number of each vehicle is thus transmitted to the server 3.

The matching process unit 433 associates the vehicles extracted by the vehicle extraction unit 431 with the license plate numbers recognized by the number recognition unit 432. This process is also referred to as "matching process." Specifically, referring back to FIG. 7, an exemplary situation in which two vehicles 91, 92 are extracted and two license plate numbers 81, 82 are recognized will be described. The matching process unit 433 calculates, for each license plate number, the distance between the license plate number and the vehicle (distance between the coordinates of the license plate number and the coordinates of the vehicle on the frame). The matching process unit 433 matches each license plate number with a vehicle with a short distance to that license plate number. In this example, since the distance between the license plate number 81 and the vehicle 91 is shorter than the distance between the license plate number 81 and the vehicle 92, the matching process unit 433 associates the license plate number 81 with the vehicle 91. Similarly, the matching process unit 433 associates the license plate number 82 with the vehicle 92. The matching process unit 433 outputs the results of the matching process (vehicles associated with the license plate numbers) to the target vehicle selection unit 434.

The target vehicle selection unit 434 selects, as a target vehicle, the vehicle whose license plate number matches the license plate number of the target vehicle (license plate number received from the server 3) from the vehicles associated with the license plate numbers by the matching process. The target vehicle selection unit 434 outputs the vehicle selected as a target vehicle to the feature extraction unit 435.

The feature extraction unit 435 extracts a feature of the target vehicle by analyzing the video including the target vehicle. More specifically, the feature extraction unit 435 extracts the traveling state (traveling position, traveling speed, traveling direction, etc.) of the target vehicle, and extracts the appearance (body type, body color, body size, etc.) of the target vehicle. The feature extraction unit 435 outputs the feature of the target vehicle to the communication unit 42. The feature of the target vehicle is thus transmitted to the movable camera system 2 and the server 3.

The movable camera system 2 includes a communication unit 51, an imaging unit 52, and an arithmetic processing unit 53. The arithmetic processing unit 53 includes an imaging control unit 531, a video buffer 532, and a video clipping unit 533.

The communication unit 51 bidirectionally communicates with the communication unit 42 (described later) of the fixed camera system 1 and the communication unit 62 (described later) of the server 3 via the network NW. The communication unit 51 receives the feature (described later) extracted from the identification video from the fixed camera system 1. The communication unit 51 transmits a viewing video captured by the movable camera system 2 to the server 3. The communication unit 51 corresponds to the communication IF 23 in FIG. 3.

The imaging unit 52 captures a viewing video to be used to generate a viewing image, as controlled by the imaging control unit 531. The imaging unit 52 outputs the viewing video to the video buffer 532. The imaging unit 52 corresponds to the movable camera 22 in FIG. 3.

The imaging control unit 531 controls movement of the imaging unit 52 (position and speed of the movable camera 22). The imaging control unit 531 includes a position determination unit 531A, an angle determination unit 531B, a rotational speed determination unit 531C, and a size adjustment unit 531D.

The position determination unit 531A determines the position (height) at which the movable camera 22 captures the target vehicle, based on the traveling position, traveling direction, and body size of the target vehicle extracted by the feature extraction unit 435. For example, the position determination unit 531A raises the position when the target vehicle is a large vehicle, as compared to the case where the target vehicle is a small vehicle (such as motorcycle). The vertical position of the target vehicle in the viewing video can thus be set to an appropriate position.

The angle determination unit 531B determines the angle (low angle, high angle, etc.) at which the movable camera 22 captures the target vehicle, based on the traveling position, traveling direction, and body size of the target vehicle extracted by the feature extraction unit 435. For example, when the target vehicle turns near the movable camera 22, the angle determination unit 531B selects a low angle (from a low position) so that it can capture a powerful, realistic viewing video. On the other hand, when the target vehicle travels in a direction away from the movable camera 22, the angle determination unit 531B selects a high angle (from a high position) so that it can capture a viewing video showing a series of movements of the target vehicle.

The rotational speed determination unit 531C determines the rotational speed of the movable camera 22 based on the traveling position and traveling speed of the target vehicle extracted by the feature extraction unit 435. In other words, the rotational speed determination unit 531C controls the movable camera 22 so that the movable camera 22 tracks the target vehicle. The rotational speed determination unit 531C acquires the traveling speed of the target vehicle in advance. This allows the movable camera 22 to be rotated at an appropriate speed and track the target vehicle from the initial timing when the viewing video of the target vehicle can be captured (timing when the target vehicle enters the capturing range of the movable camera 22).

The rotational speed determination unit 531C may determine the rotational speed of the movable camera 22 based on the appearance (such as body size, body type, or body color) of the target vehicle extracted by the feature extraction unit 435. The rotational speed determination unit 531C acquires the appearance of the target vehicle in advance. This makes it possible to distinguish the target vehicle from other vehicles and track the target vehicle more accurately.

The size adjustment unit 531D adjusts the size (zoom magnification etc.) with which the movable camera 22 captures the target vehicle, based on the body size of the target vehicle extracted by the feature extraction unit 435. This also makes it possible to set the size of the target vehicle in the viewing video to an appropriate size.

The imaging control unit 531 may include only one of the position determination unit 531A, the angle determination unit 531B, the rotational speed determination unit 531C, and the size adjustment unit 531D, only two of them, or only three of them. That is, the imaging control unit 531 may determine only one or two of the following values based on the feature extracted by the feature extraction unit 435: the position, orientation (angle), and speed (rotational speed) of the movable camera 22.

The video buffer 532 temporarily stores the viewing video. The video buffer 532 is typically a ring buffer (circular buffer), and has an annular storage area in which the beginning and end of a one-dimensional array are logically connected to each other. A newly captured viewing video is stored in the video buffer 532 in an amount corresponding to a predetermined length of time that can be stored in the storage area. An old viewing video that exceeds the predetermined length of time is automatically deleted from the video buffer 532.

The video clipping unit 533 clips, from the viewing video stored in the video buffer 532, a video of a predetermined duration (e.g., several seconds to several tens of seconds) including the timing when the target vehicle is captured. The video clipping unit 533 outputs the clipped viewing video to the communication unit 51. The viewing video including the target vehicle is thus transmitted to the server 3. The video clipping unit 533 may identify a target video in the viewing video by using the feature extracted by the feature extraction unit 435 and then clip a viewing video including the target vehicle.

Figure 10:
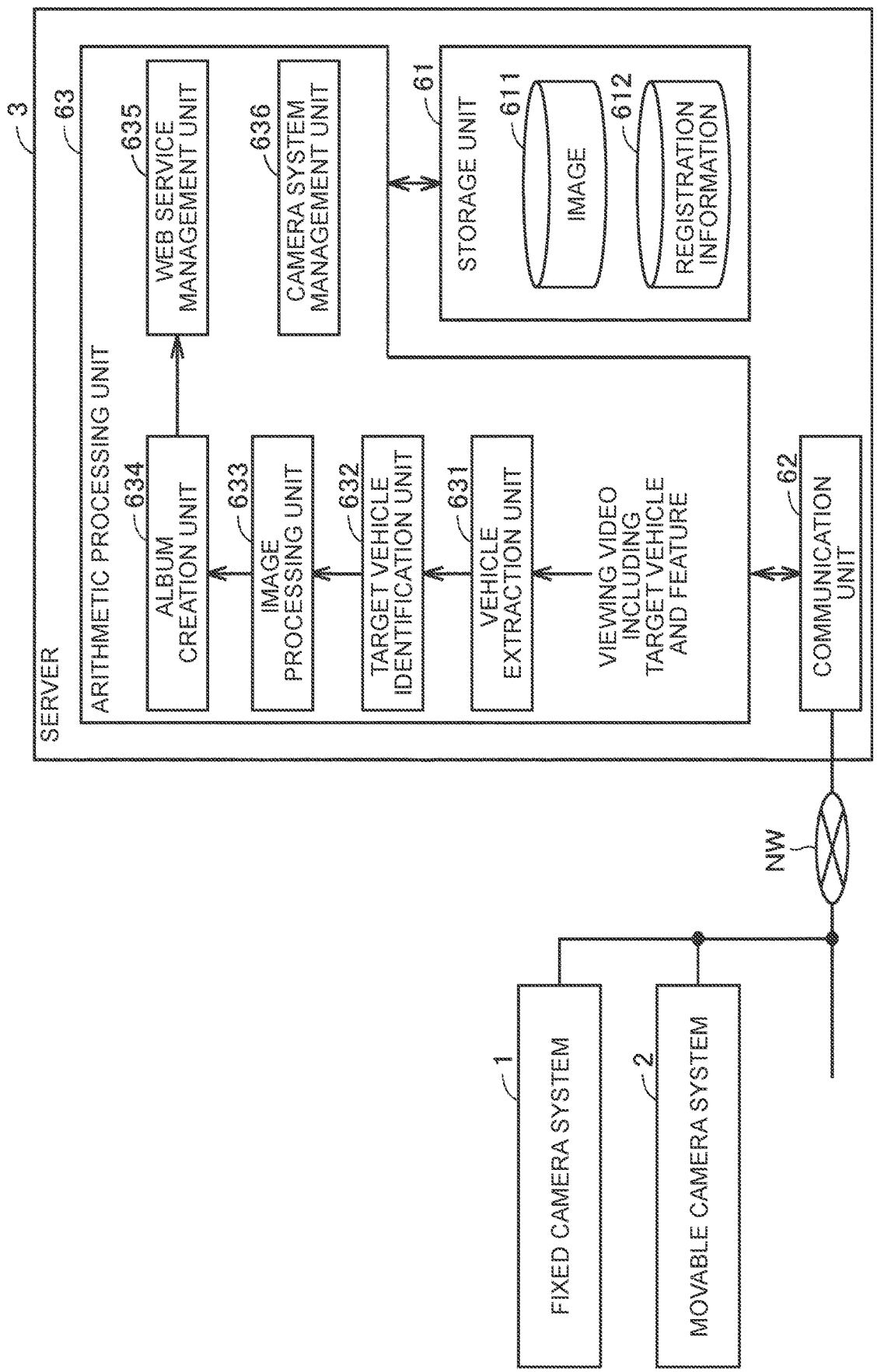
FIG. 10 is a functional block diagram showing a functional configuration of the server.

FIG. 10 is a functional block diagram showing a functional configuration of the server 3. The server 3 includes a storage unit 61, a communication unit 62, and an arithmetic processing unit 63. The storage unit 61 includes an image storage unit 611 and a registration information storage unit 612. The arithmetic processing unit 63 includes a vehicle extraction unit 631, a target vehicle identification unit 632, an image processing unit 633, an album creation unit 634, a web service management unit 635, and a camera system management unit 636.

The image storage unit 611 stores a viewing image obtained as a result of the arithmetic processing performed by the server 3. More specifically, the image storage unit 611 stores images before and after processing by the image processing unit 633, and also stores an album created by the album creation unit 634.

The registration information storage unit 612 stores registration information related to the vehicle imaging service. The registration information includes personal information of a user who applied for the provision of the vehicle imaging service, and vehicle information of the user. The personal information of the user includes, for example, information on the identification number (ID), name, date of birth, address, telephone number, and e-mail address of the user. The vehicle information of the user includes information on the license plate number of the vehicle. The vehicle information may further include, for example, information on the vehicle model, model year, body type (sedan, wagon, van, etc.), body color, and body size.

The communication unit 62 bidirectionally communicates with the communication unit 42 of the fixed camera system 1 and the communication unit 51 of the movable camera system 2 via the network NW (see FIG. 9). The communication unit 62 transmits the license plate number of the target vehicle to the fixed camera system 1. The communication unit 62 also receives the feature of the target vehicle from the fixed camera system 1 and receives the viewing video including the target vehicle from the movable camera system 2. The communication unit 42 corresponds to the communication IF 35 in FIG. 4.

The vehicle extraction unit 631 extracts vehicles (not only the target vehicle but all vehicles) from the viewing video. As in the vehicle extraction process that is performed by the vehicle extraction unit 431 of the fixed camera system 1, a trained model can be used for this extraction process. The vehicle extraction unit 631 outputs a video of the extracted vehicles (frames including vehicles) out of the viewing video to the target vehicle identification unit 632.

The target vehicle identification unit 632 identifies the target vehicle from the vehicles extracted by the vehicle extraction unit 631, based on the feature of the target vehicle (that is, the traveling state such as traveling position, traveling speed, and traveling direction, and the appearance such as body type, body color, and body size). A trained model generated by the technology of machine learning such as deep learning can also be used for this identification process. A viewing image is generated by identifying the target vehicle by the target vehicle identification unit 632. The viewing image usually includes a plurality of images (a plurality of frames successive in time). The target vehicle identification unit 632 outputs the viewing image to the image processing unit 633.

The image processing unit 633 processes the viewing image. For example, the image processing unit 633 selects an image in which the target vehicle looks best (so-called best shot) from the plurality of images. The image processing unit 633 performs various kinds of image correction (trimming, color correction, distortion correction, etc.) on the selected image. The image processing unit 633 outputs the processed viewing image to the album creation unit 634.

The album creation unit 634 creates an album by using the processed viewing image. A known image analysis technique (e.g., a technique for automatically creating a photo book, a slide show, etc. from images captured by a smartphone) can be used to create the album. The album creation unit 634 outputs the album to the web service management unit 635.

The web service management unit 635 provides a web service (e.g., an application that can be linked to an SNS) using the album created by the album creation unit 634. The user can thus view the created album and post a desired image in the album on an SNS. The web service management unit 635 may be implemented on a server different from the server 3.

The camera system management unit 636 manages (monitors and diagnoses) the fixed camera system 1. The camera system management unit 636 notifies the administrator of the server 3 when some abnormality (camera failure, communication failure, etc.) occurs in the fixed camera system 1 or the movable camera system 2 managed by the camera system management unit 636. This allows the administrator to take measures such as inspection or repair of the abnormal camera system. Like the web service management unit 635, the camera system management unit 636 may also be implemented in a separate server.

Processing Flow

Figure 11:
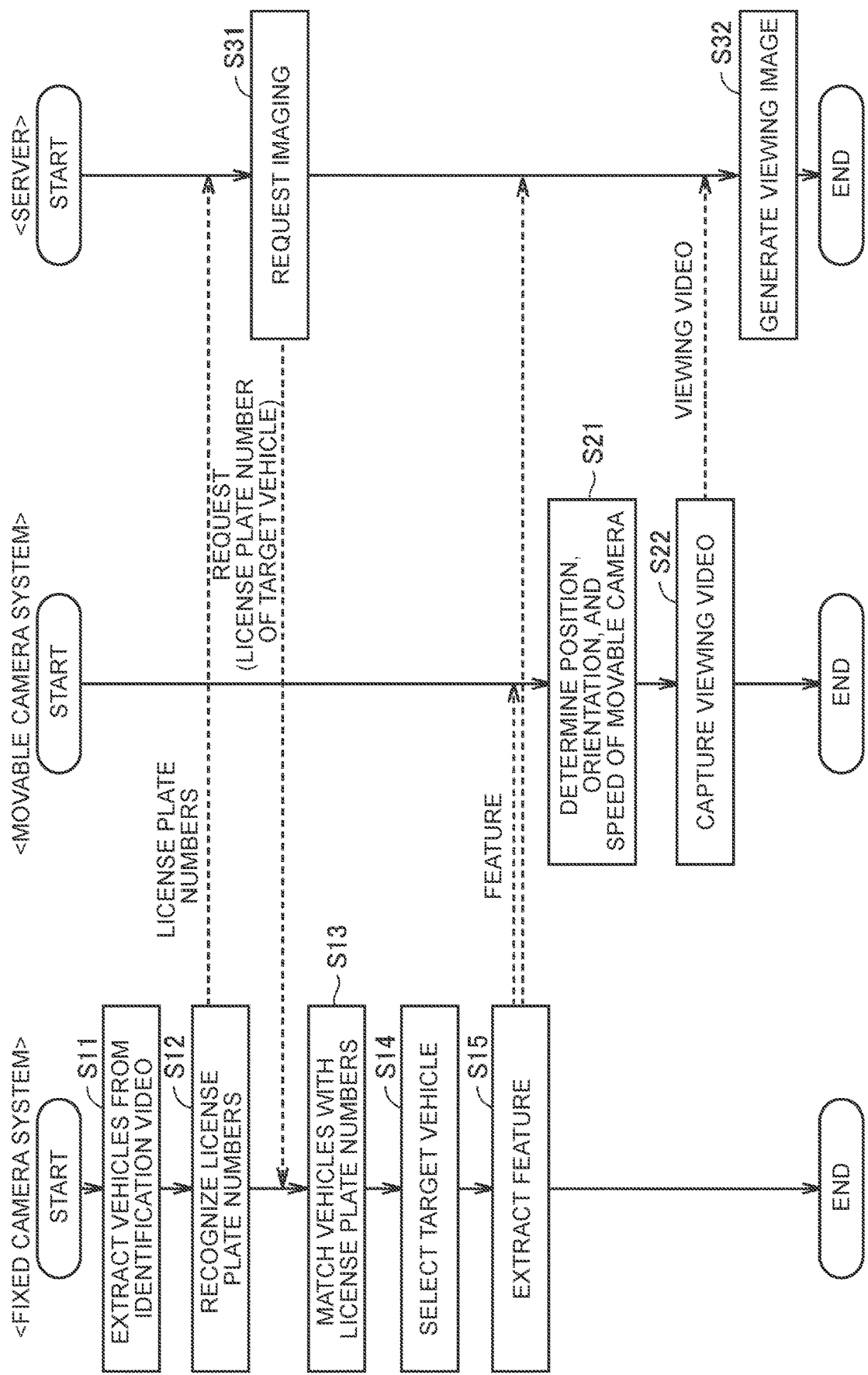
FIG. 11 is a flowchart showing a processing procedure of a vehicle imaging process according to the first embodiment.

FIG. 11 is a flowchart showing a processing procedure of the vehicle imaging process according to the present embodiment. This flowchart is executed, for example, when a predetermined condition is satisfied or at a predetermined cycle. A process that is performed by the fixed camera system 1 is shown on the left side of the figure, a process that is performed by the movable camera system 2 is shown in the middle of the figure, and a process that is performed by the server 3 is shown on the right side of the figure. Each step is implemented by software processing by the controller 11, the controller 21, or the processor 31, but may be implemented by hardware (electric circuit). Hereinafter, the step is abbreviated as "S."

In S11, the fixed camera system 1 extracts vehicles by performing the vehicle extraction process on an identification video. The fixed camera system 1 also recognizes license plate numbers from the identification video of the extracted vehicles (S12). The fixed camera system 1 transmits the recognized license plate numbers to the server 3.

When the server 3 receives the license plate numbers from the fixed camera system 1, the server 3 refers to registration information to determine whether any of the received license plate numbers is a registered license plate number (that is, any of the vehicles captured by the fixed camera system 1 is a vehicle of a user who applied for the provision of the vehicle imaging service (target vehicle)). When any of the received license plate numbers is the registered license plate number (the license plate number of the target vehicle), the server 3 transmits the license plate number of the target vehicle to the fixed camera system 1 and requests a viewing video to the fixed camera system 1 (S31).

In S13, the fixed camera system 1 performs the matching process between the vehicles and the license plate numbers in the identification video. The fixed camera system 1 then selects, as the target vehicle, the vehicle associated with the same license plate number as the license plate number of the target vehicle from the vehicles associated with the license plate numbers (S14). The fixed camera system 1 also extracts the feature (traveling state and appearance) of the target vehicle, and transmits the extracted feature to the movable camera system 2 and the server 3 (S15).

When the movable camera system 2 receives the feature from the fixed camera system 1, the movable camera system 2 determines the position, orientation (angle), and speed (rotational speed) of the movable camera 22 (S21). As described above with reference to FIG. 9, the movable camera system 2 can determine the position and angle at which the movable camera 22 captures the target vehicle, based on the traveling position, traveling direction, body size, etc. of the target vehicle. The movable camera system 2 can determine the rotational speed of the movable camera 22 based on the traveling position, traveling speed, and/or appearance of the target vehicle. The movable camera system 2 can adjust the size (zoom magnification etc.) with which the movable camera 22 captures the target vehicle, based on the body size of the target vehicle.

In S22, the movable camera system 2 captures a viewing video while controlling the movable camera 22 to the position, orientation, and speed determined in S21. The movable camera system 2 then clips a portion including the target vehicle from the captured viewing video and transmits the clipped viewing video to the server 3.

In S32, the server 3 generates a viewing image by performing a predetermined process on the viewing video received from the movable camera system 2. Since the process for generating a viewing image by the server 3 is described in detail above with reference to FIG. 10, description thereof will not be repeated.

As described above, in the first embodiment, when two camera systems (fixed camera system 1 and movable camera system 2) are installed, the position, orientation (angle), and speed (rotational speed) of the other camera system, namely the movable camera system 2, are determined based on the feature extracted from image data (identification video) captured by one of the two camera systems, that is, the fixed camera system 1. By using the feature extracted from the identification video by the fixed camera system 1, the position, orientation, and speed of the movable camera system 2 are determined according to the target vehicle, so that the movable camera system 2 can be moved appropriately.

An example in which the arithmetic processing such as image processing is split between the fixed camera system 1 and the movable camera system 2 is described in the present embodiment. In this example, both the controller 11 of the fixed camera system 1 and the controller 21 of the movable camera system 2 correspond to the "controller" according to the present disclosure. However, one of the controllers 11, 21 may be in charge of the arithmetic processing. The external server 3 may be in charge of a part or all of the arithmetic processing. That is, whether the tangible body of the "controller" according to the present disclosure is in the fixed camera system 1, the movable camera system 2, or the outside (server 3) is not particularly limited.

Second Embodiment

An example in which the movable camera system 2 is configured to rotate is described in the first embodiment. An example in which a movable camera system 2A is configured to move (translate) will be described in a second embodiment.

How Vehicle Imaging is Performed

Figure 12:
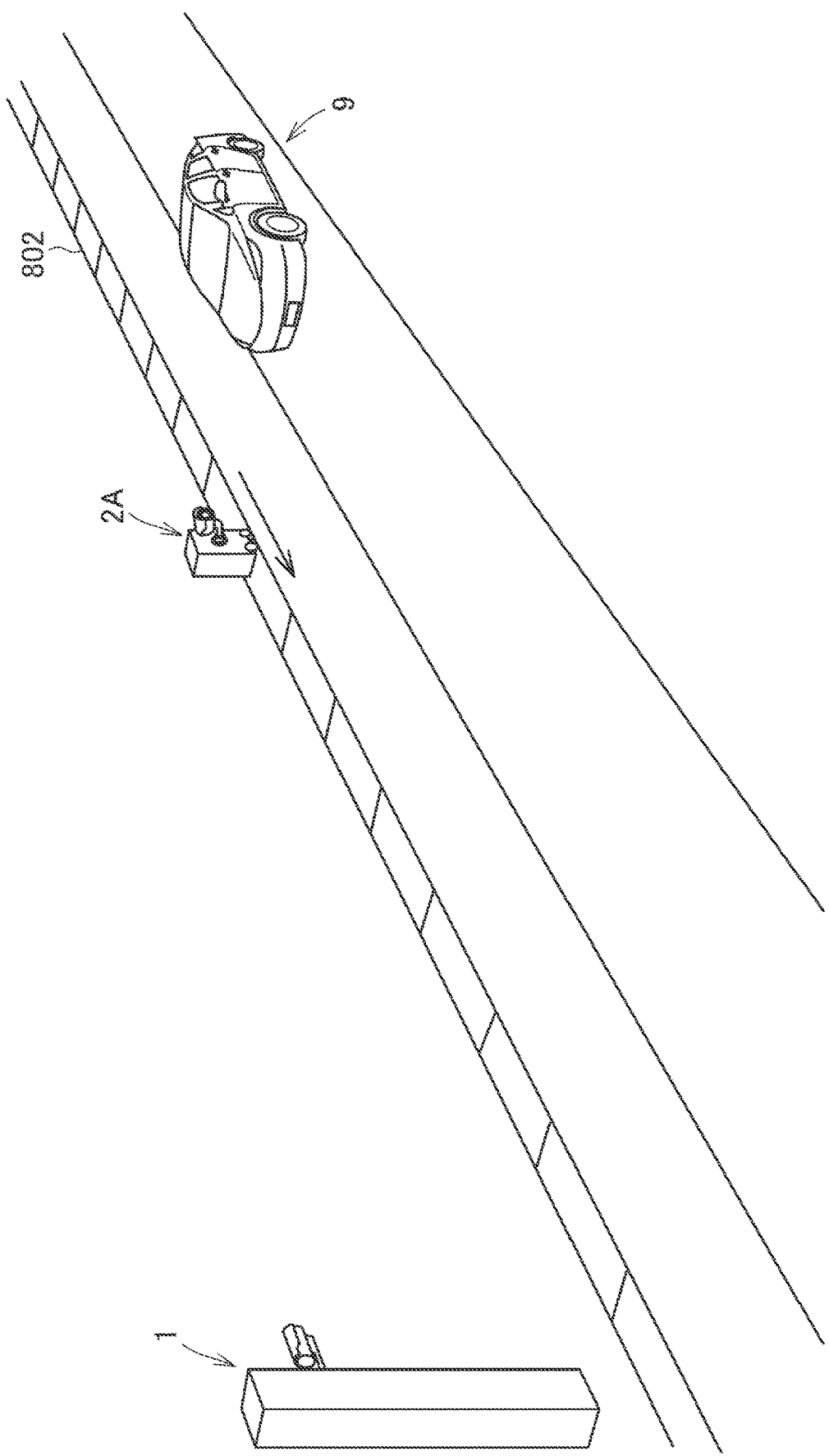
FIG. 12 is a first diagram (perspective view) showing how vehicle imaging is performed by a fixed camera system and a movable camera system according to a second embodiment.
Figure 13:
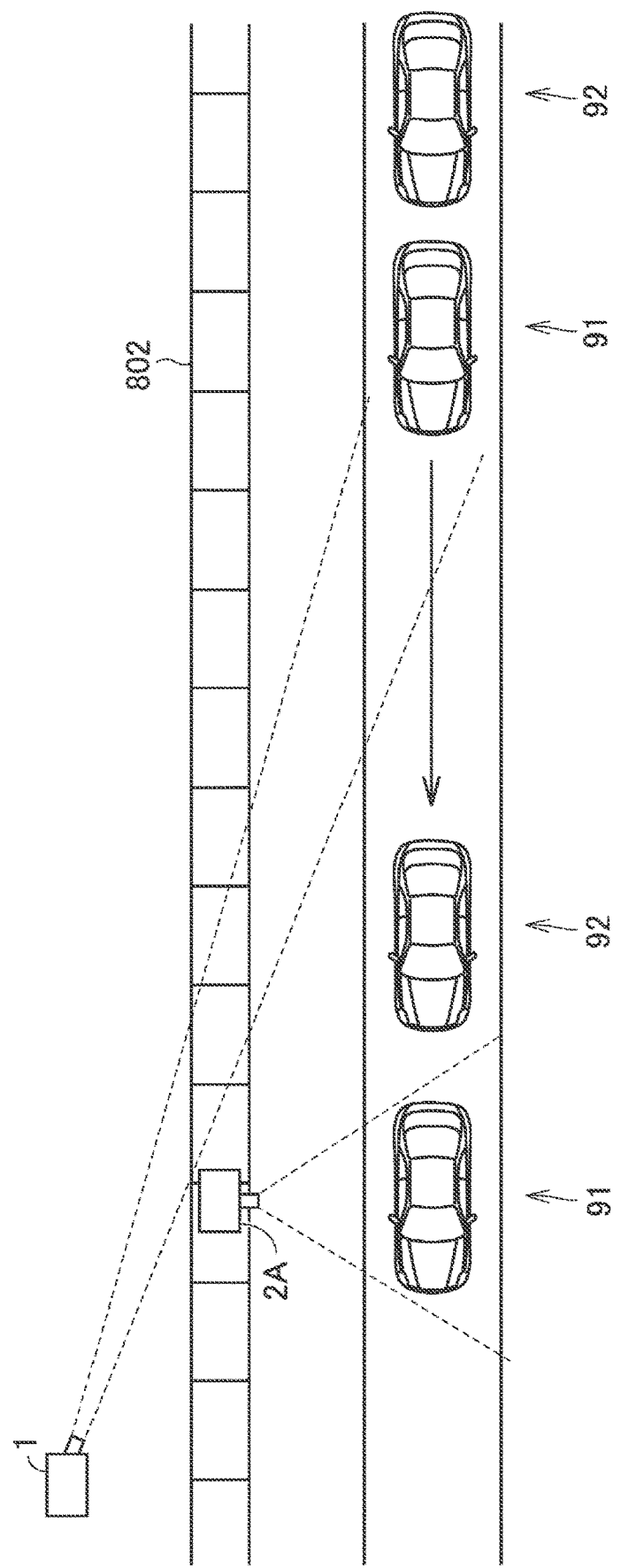
FIG. 13 is a second diagram (top view) showing how vehicle imaging is performed by the fixed camera system and the movable camera system according to the second embodiment.

FIG. 12 is a first diagram (perspective view) showing how vehicle imaging is performed by the fixed camera system 1 and the movable camera system 2A according to the second embodiment. FIG. 13 is a second diagram (top view) showing how vehicle imaging is performed by the fixed camera system 1 and the movable camera system 2A according to the second embodiment.

Referring to FIGS. 12 and 13, in the second embodiment, the fixed camera system 1 captures an identification video in a direction in which the fixed camera system 1 can capture a license plate (e.g., from the front of a vehicle), as in the first embodiment. The movable camera system 2A is installed on a rail 802. The movable camera system 2A is thus configured to translate, that is, configured to capture a viewing video right from the side of the vehicle 9 while moving on the rail 802. The movable camera system 2A is configured so that its height (position) can be adjusted on the rail 802.

FIGS. 12 and 13 show one linear rail 802 extending in a direction parallel to the road. However, the shape of the rail 802 and the number of rails 802 are set as appropriate according to the viewing video to be captured. The rail 802 may extend in a direction crossing the road. Two or more rails 802 may be installed. The installation of the rail 802 is not essential. The movable camera system 2A may be installed on a moving body such as a radio-controlled car or a drone.

Functional Configurations

Figure 14:
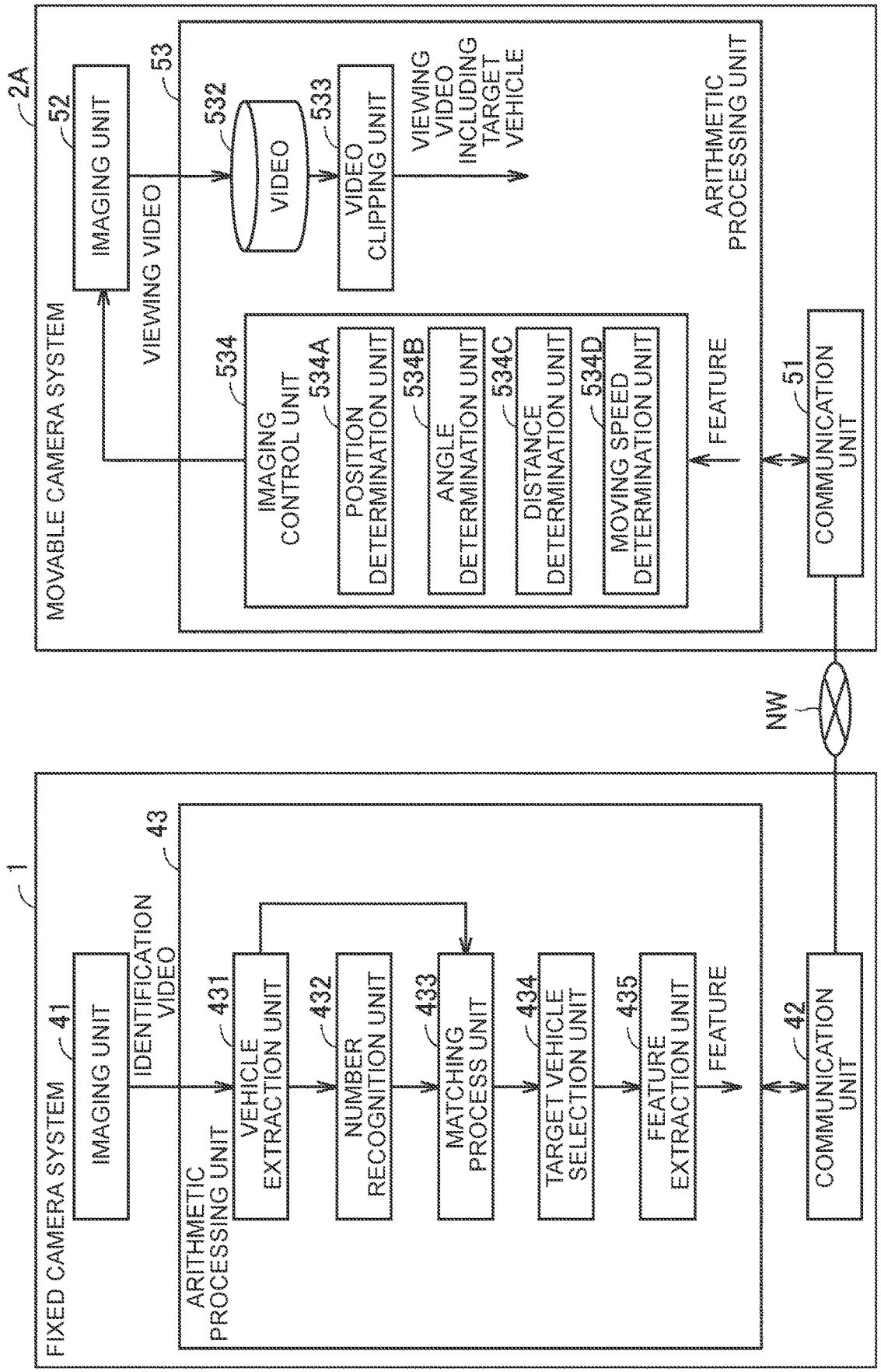
FIG. 14 is a functional block diagram showing functional configurations of the fixed camera system and the movable camera system according to the second embodiment.

FIG. 14 is a functional block diagram showing functional configurations of the fixed camera system 1 and the movable camera system 2A according to the second embodiment. The fixed camera system 1 is equivalent to the fixed camera system 1 (see FIG. 9) according to the first embodiment. The movable camera system 2A is different from the movable camera system 2 according to the first embodiment in that the movable camera system 2A includes an imaging control unit 534 instead of the imaging control unit 531. The imaging control unit 534 includes a position determination unit 534A, an angle determination unit 534B, a distance determination unit 534C, and a moving speed determination unit 534D.

Like the position determination unit 531A, the position determination unit 534A determines the position (height) at which the movable camera 22 captures the target vehicle, based on the feature (e.g., traveling position, traveling direction, and body size) of the target vehicle extracted by the feature extraction unit 435.

Like the angle determination unit 531B, the angle determination unit 534B determines the angle (low angle, high angle, etc.) at which the movable camera 22 captures the target vehicle, based on the feature (e.g., traveling position, traveling direction, and body size) of the target vehicle extracted by the feature extraction unit 435.

The distance determination unit 534C determines the distance at which the movable camera 22 captures the target vehicle (the distance from the movable camera 22 to the target vehicle), based on the traveling position and traveling direction of the target vehicle extracted by the feature extraction unit 435. For example, in the case where the travel path of the target vehicle is divided into two or more parts (e.g., when the target vehicle enters an intersection) and the movable camera 22 is installed in each of the plurality of travel paths, it is required to determine from which position the target vehicle is to be captured using which movable camera 22. The distance determination unit 534C selects the movable camera 22 to be used to capture the target vehicle, based on the traveling position and traveling direction of the target vehicle, and determines to which position the movable camera 22 should be moved. The distance determination unit 534C selects, for example, the movable camera 22 that is close to the traveling position of the target vehicle and that is movable in the traveling direction of the target vehicle, and moves the selected movable camera 22 closer to the traveling position (or an estimated traveling position) of the target vehicle. The target vehicle can thus be captured using the movable camera 22 that is present at an appropriate distance from the target vehicle.

The moving speed determination unit 534D determines the moving speed (translation speed) of the movable camera 22 based on the traveling speed of the target vehicle extracted by the feature extraction unit 435. In other words, the moving speed determination unit 534D controls the movable camera 22 so that the movable camera 22 tracks (or leads) the target vehicle. The moving speed determination unit 534D acquires the traveling speed of the target vehicle in advance. This allows the movable camera 22 to be moved at an appropriate moving speed and track the target vehicle from the initial timing when the viewing video of the target vehicle can be captured (timing when the target vehicle enters the capturing range of the movable camera 22).

The moving speed determination unit 534D may determine the moving speed of the movable camera 22 based on the appearance (such as body size, body type, or body color) of the target vehicle extracted by the feature extraction unit 435. The moving speed determination unit 534D acquires the appearance of the target vehicle in advance. This makes it possible to distinguish the target vehicle from other vehicles and track the target vehicle more accurately.

Although not shown in the figure, the imaging control unit 534 may include a size adjustment unit (similar to the size adjustment unit 531D). The size adjustment unit can adjust the size (zoom magnification, etc.) with which the movable camera 22 captures the target vehicle.

The imaging control unit 534 may include only one of the position determination unit 534A, the angle determination unit 534B, the distance determination unit 534C, and the moving speed determination unit 534D, only two of them, or only three of them. That is, the imaging control unit 534 may determine only one or two of the following values based on the feature extracted by the feature extraction unit 435: the position (distance), orientation (angle), and speed (moving speed) of the movable camera 22.

Since a flowchart showing a processing procedure of the vehicle imaging process according to the second embodiment is similar to the flowchart showing the processing procedure of the vehicle imaging process according to the first embodiment (see FIG. 11), detailed description thereof will not be repeated.

As described above, in the second embodiment, when two camera systems (fixed camera system 1 and movable camera system 2A) are installed, the position (distance), orientation (angle), and speed (moving speed) of the other camera system, namely the movable camera system 2A, are determined based on the feature extracted from image data (identification video) captured by one of the two camera systems, that is, the fixed camera system 1. By using the feature extracted from the identification video by the fixed camera system 1, the position, orientation, and speed of the movable camera system 2A are determined according to the target vehicle, so that the movable camera system 2A can be moved appropriately.

In the first and second embodiments, the target vehicle is selected by recognizing license plate numbers in the identification video. However, the method for selecting the target vehicle is not limited to this. The target vehicle may be selected based on communication information of the target vehicle (identification information of a communication device mounted on the target vehicle), or may be selected based on position information of the target vehicle (latitude and longitude of the target vehicle identified by a Global Positioning System (GPS)).

The embodiments disclosed herein should be considered to be illustrative and not restrictive in all respects. The scope of the present disclosure is shown by the claims rather than by the above description of the embodiments, and is intended to include all modifications within the meaning and scope equivalent to the claims.

What is claimed is:

1. A vehicle imaging system, comprising:
    a first camera configured to capture an image of a vehicle;
    a second camera that is movable and that is configured to capture a video of a target vehicle while the target vehicle is traveling; and
    a controller configured to control the first and second cameras,
    wherein the controller is configured to:
        recognize a first license plate number of the vehicle from image data captured by the first camera,
        transmit the first license plate number to a server,
        receive a second license plate number of the target vehicle from the server when the first license plate number is the second license plate number, the second license plate number being stored in the server,
        identify the vehicle as the target vehicle when the first license plate number matches with the second license plate number,
        extract a feature of the target vehicle from the image data captured by the first camera, the feature being a feature other than the second license plate number, and
        control at least one of a position of the second camera, orientation of the second camera, and a speed of the second camera based on the feature.

2. The vehicle imaging system according to claim 1, wherein the controller is configured to:
    extract a traveling position or a traveling direction of the target vehicle as the feature; and
    control either or both of the position of the second camera and the orientation of the second camera based on the traveling position or the traveling direction of the target vehicle.

3. The vehicle imaging system according to claim 2, wherein the controller is configured to control the position of the second camera such that, the smaller a distance between the second camera and the traveling position of the target vehicle is, the lower the position of the second camera is.

4. The vehicle imaging system according to claim 1, wherein the controller is configured to:
    extract a body size of the target vehicle as the feature; and
    control either or both of the position of the second camera and the orientation of the second camera based on the body size of the target vehicle.

5. The vehicle imaging system according to claim 4, wherein the controller is configured to control the position of the second camera such that, the larger the body size of the target vehicle is, the higher the position of the second camera is.

6. The vehicle imaging system according to claim 1, wherein the controller is configured to:
    extract a traveling speed of the target vehicle as the feature; and
    control the speed of the second camera based on the traveling speed of the target vehicle.

7. The vehicle imaging system according to claim 6, wherein the controller is configured to control the speed of the second camera based on the traveling speed of the target vehicle such that the target vehicle is within a capturing range of the second camera.

8. The vehicle imaging system according to claim 7, wherein the speed of the second camera is a rotational speed.

9. The vehicle imaging system according to claim 1, wherein the controller is configured to:
    extract a body size, a body type, or a body color of the target vehicle as the feature; and
    control the speed of the second camera based on the body size, the body type, or the body color of the target vehicle.

10. The vehicle imaging system according to claim 1, wherein the controller is configured to:
    extract a body size of the target vehicle as the feature; and
    further control a zoom magnification of the second camera based on the body size of the target vehicle.

11. The vehicle imaging system according to claim 1, wherein the second license plate number is absent from the video captured by the second camera.

* * * * *